(12) United States Patent
Schmidt et al.

(10) Patent No.: US 12,522,093 B2
(45) Date of Patent: Jan. 13, 2026

(54) CHARGING STATION

(71) Applicant: JOYSONQUIN Automotive Systems GmbH, Rutesheim (DE)

(72) Inventors: Konstantin Schmidt, Stuttgart (DE); Lucia Hornfischer, Stuttgart (DE); Claudia Wengert, Pforzheim (DE); Ionut Oprea, Com. Sanpetru—Jud. Brasov (RO)

(73) Assignee: JOYSONQUIN Automotive Systems GmbH, Rutesheim (DE)

( * ) Notice: Subject to any disclaimer, the term of this patent is extended or adjusted under 35 U.S.C. 154(b) by 751 days.

(21) Appl. No.: 17/864,296

(22) Filed: Jul. 13, 2022

(65) Prior Publication Data
US 2023/0015662 A1    Jan. 19, 2023

(30) Foreign Application Priority Data

Jul. 16, 2021 (DE) .......................... 202021103805.5

(51) Int. Cl.
*B60L 53/31* (2019.01)
*B60L 53/18* (2019.01)
*B65H 75/44* (2006.01)
*H02J 7/00* (2006.01)

(52) U.S. Cl.
CPC .............. *B60L 53/31* (2019.02); *B60L 53/18* (2019.02); *B65H 75/44* (2013.01); *B65H 2701/34* (2013.01); *H02J 7/0042* (2013.01)

(58) Field of Classification Search
CPC .......... B60L 53/31; B60L 53/18; H02J 7/0042
USPC ....................................................... 320/109
See application file for complete search history.

(56) References Cited

U.S. PATENT DOCUMENTS

| | | | |
|---|---|---|---|
| 8,025,526 B1* | 9/2011 | Tormey | H01R 13/6397 |
| | | | 439/372 |
| 9,610,851 B2* | 4/2017 | DeBoer | H02J 3/322 |
| 2012/0091961 A1* | 4/2012 | Hani | B60L 53/65 |
| | | | 320/109 |
| 2013/0020990 A1 | 1/2013 | DeBoer et al. | 320/109 |
| 2013/0175083 A1* | 7/2013 | Bonwit | B60L 53/305 |
| | | | 174/541 |

(Continued)

FOREIGN PATENT DOCUMENTS

| | | |
|---|---|---|
| CN | 201204006 Y | 3/2009 |
| CN | 102884652 | 1/2013 |

(Continued)

OTHER PUBLICATIONS

Tesla Vehicle Charger Manual, Tesla Motors, pp. 9-11, 2012-2014 (Year: 2012).*

(Continued)

*Primary Examiner* — Suchin Parihar
(74) *Attorney, Agent, or Firm* — Fattibene & Fattibene, LLC; Paul A. Fattibene

(57) ABSTRACT

A charging station for charging an electric vehicle with a housing which has a rear side and a visible side located opposite thereto, wherein between the rear side and the visible side there is formed a storage region adapted to compactly hold a charging cable provided with a charging plug. A decorative element connected to the housing and/or the charging plug and/or a stand supporting the housing is/are provided.

17 Claims, 2 Drawing Sheets

(56) References Cited

U.S. PATENT DOCUMENTS

| | | | | |
|---|---|---|---|---|
| 2013/0175989 | A1* | 7/2013 | Bonwit | B60L 53/16 320/109 |
| 2013/0322017 | A1* | 12/2013 | Muller | H05K 5/0214 361/690 |
| 2014/0120764 | A1 | 5/2014 | Valadas et al. | 439/488 |
| 2016/0229305 | A1* | 8/2016 | Shumaker | H04W 12/06 |
| 2017/0358944 | A1* | 12/2017 | Salter | F21V 5/10 |
| 2020/0001721 | A1 | 1/2020 | Merryweather et al. | B60L 1/04 |
| 2020/0039558 | A1* | 2/2020 | Aerts | B62D 1/046 |
| 2020/0272950 | A1* | 8/2020 | Xu | G06Q 30/0185 |
| 2021/0313927 | A1* | 10/2021 | Dunn | H02S 30/10 |
| 2022/0161670 | A1 | 5/2022 | Bonsch et al. | B60L 53/16 |
| 2022/0194236 | A1* | 6/2022 | Whiting | B60L 53/64 |
| 2022/0299330 | A1* | 9/2022 | Fagenson | G06Q 30/0237 |
| 2022/0379759 | A1* | 12/2022 | Harmon | B60L 53/30 |
| 2023/0263919 | A1* | 8/2023 | Preisler | B67D 7/86 141/94 |
| 2023/0294535 | A1* | 9/2023 | Eslinger | B60L 58/12 320/109 |
| 2023/0352808 | A1* | 11/2023 | Chin-Chung | H02J 50/10 |
| 2023/0375603 | A1* | 11/2023 | Ferree | G01R 22/065 |
| 2024/0198827 | A1* | 6/2024 | Vicari | B60L 53/30 |

FOREIGN PATENT DOCUMENTS

| | | |
|---|---|---|
| CN | 102891509 | 1/2013 |
| CN | 103875134 | 6/2014 |
| CN | 110352141 | 10/2019 |
| CN | 110949543 | 4/2020 |
| CN | 213354624 U | 6/2021 |
| DE | 102019009020 | 1/2021 |
| WO | WO 2011/112636 | 9/2011 |
| WO | WO 2020201301 | 10/2020 |

OTHER PUBLICATIONS

German Search Report, in counterpart application No. 202021103805. 5, Dated Mar. 2, 2022, 5 pages.

EVBox manufacturing B.V.: Manual A. ID Charger. Installations, 2020, 8 pages.

Heidelberger Druckmaschinen AG, Heidelberg Wall box, Apr. 16, 2021, 12 pages.

Office Action in counterpart Chinese patent application No. 2022108363563 dated Jan. 12, 2025, English translation, 6 pages.

\* cited by examiner

CHARGING STATION

FIELD OF THE INVENTION

The present invention relates to a charging station for charging an electric vehicle.

BACKGROUND OF THE INVENTION

Such charging stations are also called "wall box", even when they are not mounted to a wall.

The present invention is based on the problem of providing a charging station with an enhanced design.

SUMMARY OF THE INVENTION

In order to solve this problem, the present invention discloses a charging station with the features of the embodiments described.

The charging station has a housing in a known manner. This housing has a rear side. The rear side is usually the mounting side of the housing. The rear side may be adapted to be mounted to a wall. The rear side may also be connected to a post/stand which supports the charging station relative to the floor. The rear side is usually used to pass a cable for electrical power to the charging station into the interior of the housing. In the interior of the housing, electronics and/or a control system can be provided, via which the supply of current for charging the electric vehicle is controlled in a predetermined manner and/or in a manner specified by the user. In the interior of the housing, the charging cable is usually also connected. The other end of the charging cable is provided with a charging plug adapted to be plugged into a mating plug of an electric vehicle.

Opposite the rear side, the housing has a visible side. This visible side usually extends in parallel to the rear side and thus in parallel to a wall if the charging station is mounted to a wall. A storage area is formed between the rear side and the visible side. This storage area is adapted to compactly hold the charging cable. For this purpose, the charging cable is usually wound around the storage area. The charging cable does not necessarily have to be wound around the storage area with several windings in order to satisfy the requirement of a compact holder for the charging cable. Rather, it is sufficient if a certain length range of the charging cable is accommodated in the storage area. Of course, the charging cable can be wound several times around the storage area and thus be accommodated there in as compact a form as possible.

The charging station according to the present invention differs from these usual design features of a charging station by a decorative element detachably connected to the housing and/or the charging plug and/or a stand supporting the housing.

The decorative element has a decorative design. For this purpose, the decorative element can have one or more decorative layers provided next to one another, one inside the other or one behind the other. The decorative layers can be formed by textile, a film of plastic or metal, wood, in particular veneer or a lacquer layer or any combination thereof, all decorative layers being preferably connected to and/or arranged on a substrate. The substrate is usually an injection molded body. The injection-molded body is usually configured as a carrier, i.e. it is dimensionally rigid in itself and supports the at least one decorative layer of the decorative element. The carrier is usually made of plastic. The carrier can have mounting elements for detachable mounting to the housing, preferably can form a single piece, or alternatively the mounting elements are mounted on the housing/holding frame. The detachable mounting is preferably effected by means of latching elements, which may be formed complementarily on the housing and carrier.

The carrier can be formed by overmolding the at least one decorative layer. In this way, not only is the decorative layer connected to the carrier, but it is also simultaneously master formed and thus produced in final contour. On the visible side, the decorative element can have a front decorative layer provided with through-holes, on which a usually continuous decorative layer is deposited on the rear side opposite the visible side, which decorative layer is pressed through the through-holes of the front decorative layer during master forming of the carrier as a result of an acting mold pressure, for example an injection pressure, so that surface portions of the front and rear decorative layers are visible essentially in one plane on the visible side.

The visible side of the decorative element can be covered with a transparent and/or translucent layer and/or a protective layer and/or it can be masked with such a layer. Such a protective layer on the visible side can also be formed by injection molding.

The protective layer can be molded onto the decorative element by injection molding to create a particularly robust connection between the protective layer and the decorative element. In particular, the protective layer is formed in one piece with the decorative element.

Alternatively or additionally, the protective layer can be a coating, in particular applied to the decorative element using a deposition method such as painting or coating. The coating is inexpensive to produce.

By means of injection molding or another master forming, reshaping or separating production method, the protective layer can also be produced separately from the decorative element to provide a particularly robust part that can be replaced, e.g. in the event of damage.

The decorative element can be partially transparent and/or translucent. Preferably, at least one non-transparent and/or non-translucent layer of the decorative element is provided with through-holes which are filled with a translucent and/or transparent material, so that a flat surface results on the visible side, but light from a light source provided on the rear side of the decorative element can nevertheless pass through the translucent and/or transparent area to the front. This light-guiding area can be a logo, lettering or any graphic element.

The logo and/or lettering can be individually adapted to the electric vehicle to be charged. For example, the trademark of the vehicle manufacturer or model can be formed through the translucent area and be visible on the visible side. In addition, the translucent or partially transparent configuration of the decorative layer can allow it to be backlit or transilluminated.

The decorative element is also usually configured to match the design of the vehicle. Thus, a decorative layer or the decorative element as a whole can be configured in the color of the selected vehicle. Preferably, the decorative element corresponds to the decorative elements of the interior design of the vehicle. Such lining parts usually cover at least partially the dashboard, the side doors, covers of the center console and/or the steering wheel. Such decorative parts of the interior lining are usually identically configured. They are usually to be individually determined by the customer of a vehicle when ordering.

The decorative configuration of the charging station can also be adapted to the design of the vehicle beyond the design of the decorative element. Thus, the housing and/or a frame connected to the housing and holding the decorative element can be adapted to design details of the vehicle. Preferably, the holding frame, which is usually made of plastic, is adapted to a lining part of the vehicle interior. Thus, for example, the holding frame can be provided in a piano lacquer look or a chrome look, provided that corresponding looks are used in the interior lining of the vehicle.

The decorative surface of the decorative element and/or of the housing and/or of the holding frame can be determined by the nature of the plastic granules by which the plastic part is formed. Subsequent painting or metallization is also conceivable.

The present invention allows this individualization of the vehicle to be carried out at the charging station as well. The vehicle is an electric vehicle and thus at least partially electrically powered.

The decorative element of the charging station and the respective interior lining parts of the vehicle are usually manufactured in one. This ensures that the decorative surfaces of the charging station on the one hand and the vehicle interior on the other provide the same design statement. The mounting of the decorative element is usually carried out by the same means as those used to mount the interior lining parts on the vehicle. The decorative element can be latched, glued, screwed, welded or connected to the housing by heat caulking of fastening pins which are preferably formed on the decorative element and engage in recesses of the housing. Essential for the realization of the invention is at least a simple assembly of the decorative element basically after the housing has been manufactured, preferably after the charging station has been completely assembled. Particularly preferable, however, are solutions in which the decorative element can be captively connected to the housing of the charging station without tools but after assembly. The housing is usually already functional in itself. In other words, the decorative element fulfills merely decorative, however not functional tasks.

The housing can have essentially the same base area and basic shape on the visible side and the rear side. The visible side and the rear side are usually arranged in parallel to each other. The storage area is provided between these two base surfaces formed by the visible side and the rear side. This storage area is surrounded by the visible side and the rear side preferably at least partially, usually completely, so that the charging cable can be wound up easily between the visible side and the rear side. The said decorative element is placed against the visible side and connected thereto.

According to the present invention, the housing surrounds components of the electronics and/or electrical system for the charging process. This housing preferably has an inner chamber for accommodating the corresponding components, which is covered with respect to the rear side of the decorative element. Thus, in any case, on the front side of the housing facing the visible side, there is a cover which closes and/or covers the components of the electric system and the electronics so as to be inaccessible to the user when the decorative element is changed. Even if the decorative element is replaced by the user, the components of the electric system and/or electronics are preferably protected from external influences. The same applies to the charging plug or the stand. Preferably, the housing can be formed from two housing parts which form between them the previously mentioned chamber for accommodating the electric system and/or the electronics. The cable is led out of this chamber in a fluid-tight manner. The two halves of the housing can be made of plastic, for example, and welded together so that the chamber is hermetically sealed from the atmosphere. This prevents moisture from entering the housing. Equally well, the two housing parts can abut against each other with the interposition of a seal.

The decorative element can be connected to the housing via a holding frame. The holding frame can grip the decorative element at the edge and fix it at the front. The holding frame usually surrounds the decorative element completely. Thus, the holding frame preferably forms/leaves free a frame opening in which the decorative element is provided. A protective layer, for example in the form of a plastic or glass pane, is usually inserted in this frame opening. This protective layer is held by the holding frame which, due to its mounting on the housing, preferably fixes the protective layer and the decorative element relative to the housing.

At least one layer or at least the protective layer, which is preferably transparent and/or translucent, can cover the decorative element.

The protective layer is, for example, a coating of the decorative element or a separate part that can be applied to the decorative element. For example, the protective layer is configured to be fluid-tight and/or flexurally-rigid.

The protective layer can protect the decorative element against wear, scratching and/or mechanical damage. If UV radiation is sufficiently absorbed, the protective layer protects the decorative element against fading. Preferably, the protective layer also serves to protect the housing, in particular the chamber and/or the components of the electronics or electrics for the charging process. In particular, the protective layer serves as protection against impacts against the charging station, against fluid penetration and/or against manipulation of the charging station. Further, the protective layer increases the safety of a user by preventing electrocution of the user by reaching into the chamber.

The protective layer can have at least substantially the shape of the decorative element. In other words, the outline of the protective layer corresponds at least approximately to the outline of the decorative element. In particular, the protective layer is at least substantially planar. Thus, the protective layer can be in contact with the decorative element over a large area in order to protect it. Thus, likewise, the holding frame can simply accommodate the protective layer and the decorative element at the same time.

The holding frame is usually placed against the housing with the interposition of a seal. This prevents moisture from getting between the housing and the holding frame. The decorative element is preferably held in the holding frame with a form-fit, which for this purpose forms/leaves free a frame opening that is slightly smaller than the base area of the decorative element. Thus, the decorative element lies with its visible side on the inside against edge surfaces of a frame opening. In view of an easy exchangeability of the decorative element, the fixing of the same in the holding frame is preferably done by latching. The holding frame, and in particular the opening for accommodating the decorative element, enables sealing by the decorative element when the decorative element is mounted on the holding frame. The latching connection can provide for a pretension of the decorative element. The decorative element itself can be surrounded at the edge by a seal, which can be connected to the decorative element by a form-fit, force-fit or material closure. The seal is preferably formed on the decorative element by overmolding a soft-elastic plastic. The clip connection between the decorative element and the holding frame can have a latching element which forms an initially funnel-shaped rear side accommodation for the decorative element. In this way, the decorative element can be easily arranged in the frame opening and thus latched. The corresponding latch has a release lever or button with which the connection between the holding frame and the decorative element can be easily released. The same applies to the charging plug or the stand. Here, too, the decorative element can be mounted with a holding frame.

Although the above description refers to the housing as the preferred element on which the decorative element is to be mounted, it is understood that the decorative element can also be arranged on the charging plug. In this case, the decorative element usually follows the contour of the charging plug like an interior lining part of a vehicle. Alternatively or additionally, the decorative element can also be mounted on a stand by means of which the housing is supported relative to the base.

Essential for the invention is the subsequent connectability of the decorative element with the housing, the charging plug and/or the stand. Preferably, this connection is detachable. A detachable connection should be such that it can be carried out by the user of the charging station without special aids. For example, latching and/or clip connections are particularly suitable for connecting the decorative element to a part of the charging station. The latching and/or clip connection can connect the decorative element directly to the housing or indirectly to the housing. Detachable connections can be formed both between the holding frame and the housing on the one hand and between the decorative element and the holding frame and/or the housing on the other. The detachable connections allow the decorative element to be removed for cleaning purposes and/or replaced by another, new and differently designed decorative element. The same applies for repair purposes.

BRIEF DESCRIPTION OF THE DRAWINGS

Further details and advantages of the present invention will be apparent from the following description of an embodiment in conjunction with the drawing. Therein.

DETAILED DESCRIPTION OF THE INVENTION

Figure 1:
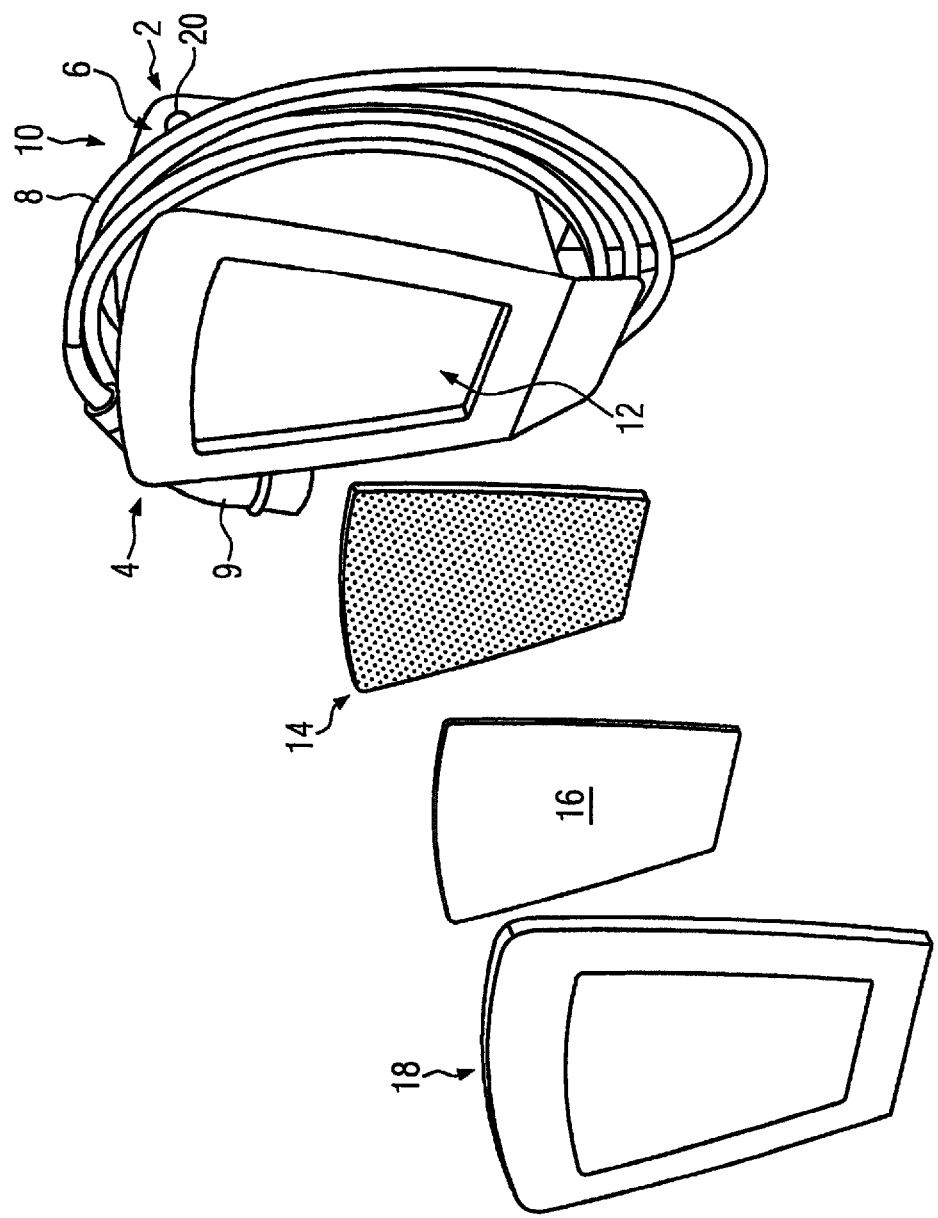
FIG. 1 shows a perspective side view of a first embodiment.

The embodiment shown in FIG. 1 has a rear side 2 in the form of a rear fastening flange and a front side 4 in the form of a front flange. A cylindrical storage area 6 extends between them, which connects the two flanges 2, 4 to one another and keeps them at a distance. The storage area 6 has an at least substantially circumferentially closed outer peripheral surface. The storage area 6 is typically penetrated by a charging cable 8 and a charging plug 9.

Reference sign 10 characterizes a housing formed by the two flanges 2, 4 and the storage area 6. The visible sided flange 4 has a recess 12 which is adapted for inserting a decorative element 14. After the assembly, the decorative element 14 is basically flush with the front side of the visible sided flange 4. Reference sign 16 characterizes a protective layer consisting of a transparent pane of glass or plastic. The protective layer 16 can be UV-absorbent. Reference sign 18 characterizes a holding frame which is subsequently connected to the housing 10 with interposition of the protective layer 16 and the decorative element 14. The holding frame 18 is usually clipped to the housing 10 and can be detached from the housing 10.

The protective layer 16 mechanically protects the decorative element 14 and thus the charging station as a whole. The protective layer 16 is fluid-tight, flexurally-rigid, and a separate part from the decorative element 14. The decorative element 14 may therefore be more mechanically sensitive, e.g. softer and/or less rigid, than the decorative element 14. The protective layer 16 also constitutes a barrier against intrusion into the interior of the charging station.

It is evident that the rear side has a plurality of bores 20 via which the housing 10 is to be screwed to a wall. The rear side 2 is provided with a flat contact surface at the rear for fixing against a wall.

Figure 2:
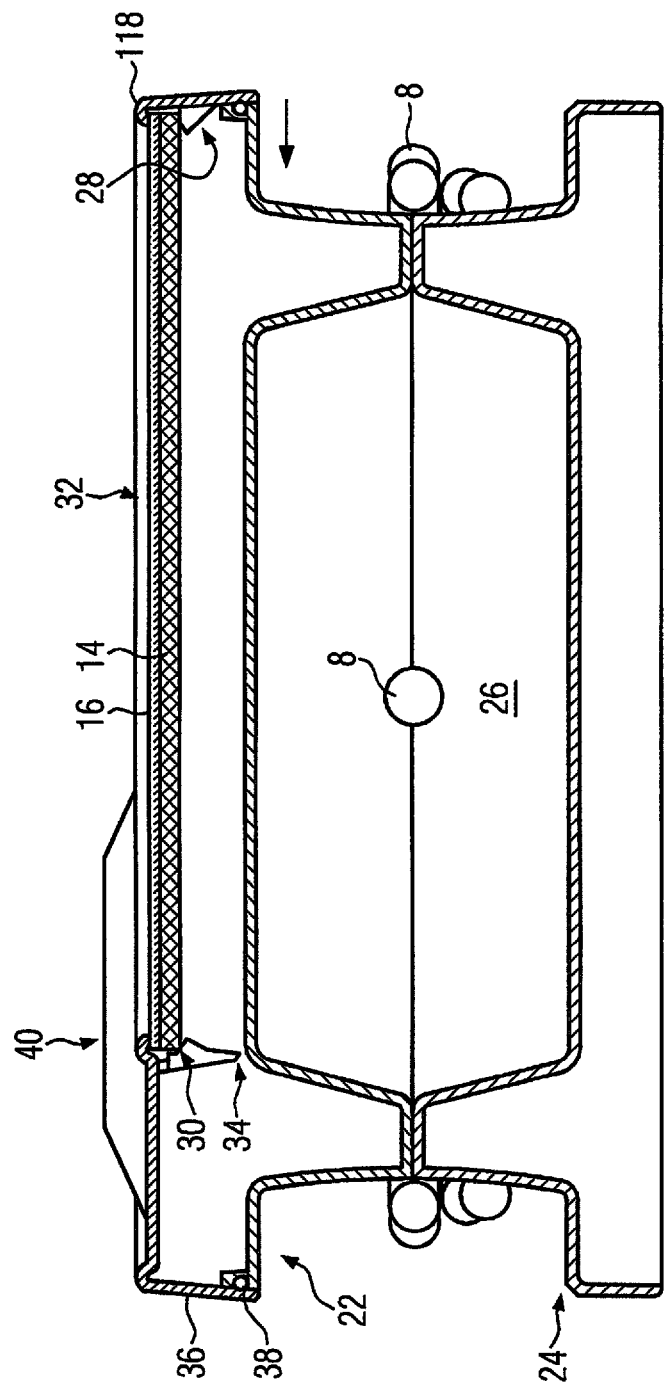
FIG. 2 shows a cross-sectional view of a second embodiment along a horizontal axis.

FIG. 2 illustrates the structure of the housing of a second embodiment. The housing is formed from two housing shell elements 22, 24 having approximately the same configuration. The housing shell elements 22, 24 each have a central shell-shaped recess surrounding a chamber 26 for accommodating electrical and electronic components of the charging station. The charging cable 8 is shown with its one end inside the chamber 26 and is sealingly guided to the outside between the two housing shell elements 22, 24. The chamber 26 is then sealed from the environment. The two housing shell elements 22, 24 formed of plastic may be welded together between the chamber and its outer peripheral surface forming the storage area 6.

As the sectional view according to FIG. 2 makes clear, latching elements in the form of a stationary latching lug 28 and a pivotable latch 30 are provided on the inside of the holding frame 118, which abut against the decorative element 14 on the rear side facing away from the visible side. By means of these latching elements 28, 30, the visible side of the decorative element 14 is sealingly placed against an inner surface of the holding frame 118, which surrounds a frame opening 32 of the holding frame 118. A sealing element can be provided between the inner surface of the holding frame 118 and the visible side of the decorative element 14. The sealing element can be inserted into a circumferential groove formed by the holding frame 118. The sealing element can also be realized in one piece on the decorative element 14.

As FIG. 2 illustrates, the latch 30 has a latching projection which abuts against the rear side of the decorative element 14 and is surmounted towards the interior of the holding frame 118 by a release lever 34. A sealing ring 38 is inserted between the housing shell element 22 on the visible side, i.e. a holding flange formed on the visible side, and a peripheral surface 36 of the holding frame 118. As a result of the sealing measures described above, the interior of the holding frame 118 is also sealed off from the surroundings.

As FIGS. 1 and 2 make clear, the decorative element 14 does not cover the entire visible side of the holding frame 18, 118. This also forms a plug-in receptacle 40 for receiving the charging plug 9.

LIST OF REFERENCE SIGNS 2 rear side
4 visible side
6 storage area
8 charging cable
9 charging plug
10 housing
12 recess
14 decorative element
16 protective layer
18, 118 holding frame
20 bores 22 housing shell element
24 housing shell element
26 chamber
28 latching lug
30 latch
32 frame opening
34 release lever
36 peripheral surface
38 sealing ring
40 plug-in receptacle

What is claimed is:

1. Charging station for charging an electric vehicle with a housing having a rear side and a visible side located opposite thereto,
   wherein between the rear side and the visible side, a storage area adapted to compactly hold a charging cable provided with a charging plug is formed,
   wherein the charging station comprises a decorative element connected to at least one selected from the group comprising the housing, the charging plug and a stand supporting the housing,
   wherein the charging station comprises a holding frame,
   wherein the holding frame is connected to the housing and fixing the decorative element relative to the housing, and
   wherein the holding frame leaves free a frame opening in which a transparent or translucent protective layer is provided, the transparent or translucent protective layer covering the decorative element.

2. Charging station according to claim 1, wherein the decorative element is detachably connected to the housing.

3. Charging station according to claim 1, wherein the decorative element is detachably mounted on the charging plug.

4. Charging station according to claim 1, wherein the decorative element is detachably mounted on the stand that supports the housing relative to the floor.

5. Charging station according to claim 1, wherein the decorative element is provided to extend in parallel to the rear side.

6. Charging station according to claim 1 wherein the holding frame is detachably connected to the housing.

7. Charging station according to claim 1, wherein the holding frame leaves free the frame opening in which the decorative element is provided.

8. Charging station according to claim 1, wherein the protective layer is provided in one piece on the decorative element.

9. Charging station according to claim 1, wherein the visible side and the rear side are formed with substantially the same base area and base shape and are arranged in parallel to one another and surround the storage area at least partially.

10. Set comprising a decorative element adapted for mounting on a housing of a charging station for charging an electric vehicle, and at least one interior lining part for an electric vehicle, wherein the decorative element and the interior lining part have matching decorative surfaces, and wherein the decorative element and the interior lining are manufactured in one.

11. Charging station for charging an electric vehicle with a housing having a rear side and a visible side located opposite thereto, wherein between the rear side and the visible side, a storage area adapted to compactly hold a charging cable provided with a charging plug is formed, wherein a decorative element is mounted on the charging plug and/or a stand supporting the housing relative to a floor.

12. Charging station according to claim 11, wherein the decorative element is detachably connected to the charging plug and/or the stand.

13. Charging station according to claim 11, wherein the decorative element is provided to extend in parallel to the rear side.

14. Charging station according to claim 11, wherein the visible side and the rear side are formed with substantially the same base area and base shape and are arranged in parallel to one another and surround the storage area at least partially.

15. Charging station according to claim 1, wherein:
   the frame opening is smaller than the decorative element,
   whereby edges of the frame opening hold the decorative element and the decorative element is capable of being replaced by a user.

16. Charging station according to claim 1, further comprising:
   a latch formed in the housing adjacent the frame opening, the latch configured to make a detachable connection with the decorative element,
   whereby the decorative element is capable of being replaced by a user.

17. Charging station according to claim 1, wherein:
   the electric vehicle has an interior lining part having a design; and
   the decorative element connected to the charging station has the same design as the design of the interior lining part of the vehicle.

* * * * *